Figure 1:
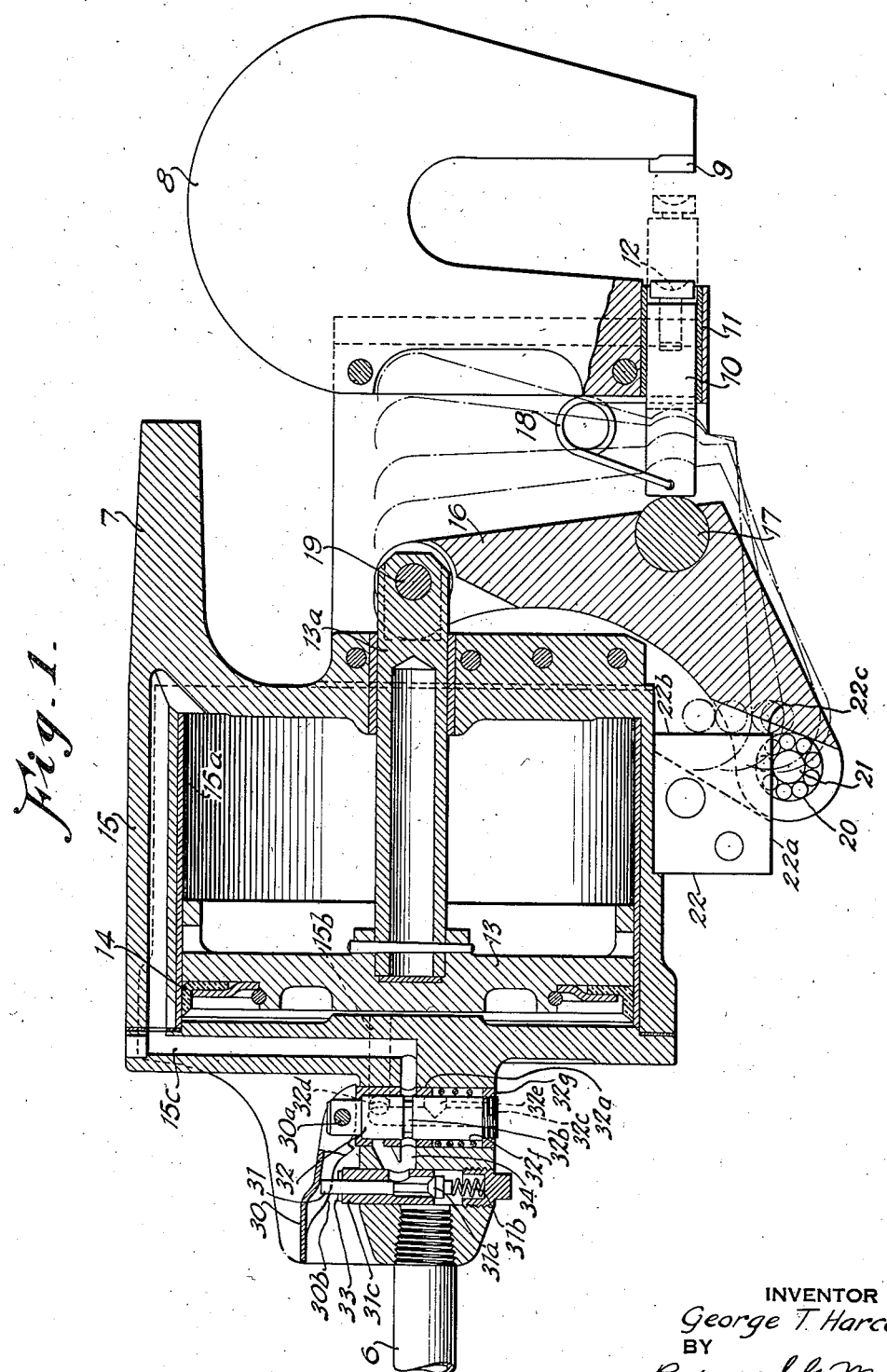

Sept. 1, 1936.　　　G. T. HARCOURT　　　2,052,976
POWER CONTROL APPARATUS
Original Filed May 23, 1929　　2 Sheets-Sheet 1

INVENTOR
George T. Harcourt
BY
Raymond G. Mullee
ATTORNEY

Sept. 1, 1936.   G. T. HARCOURT   2,052,976.
POWER CONTROL APPARATUS
Original Filed May 23, 1929    2 Sheets-Sheet 2
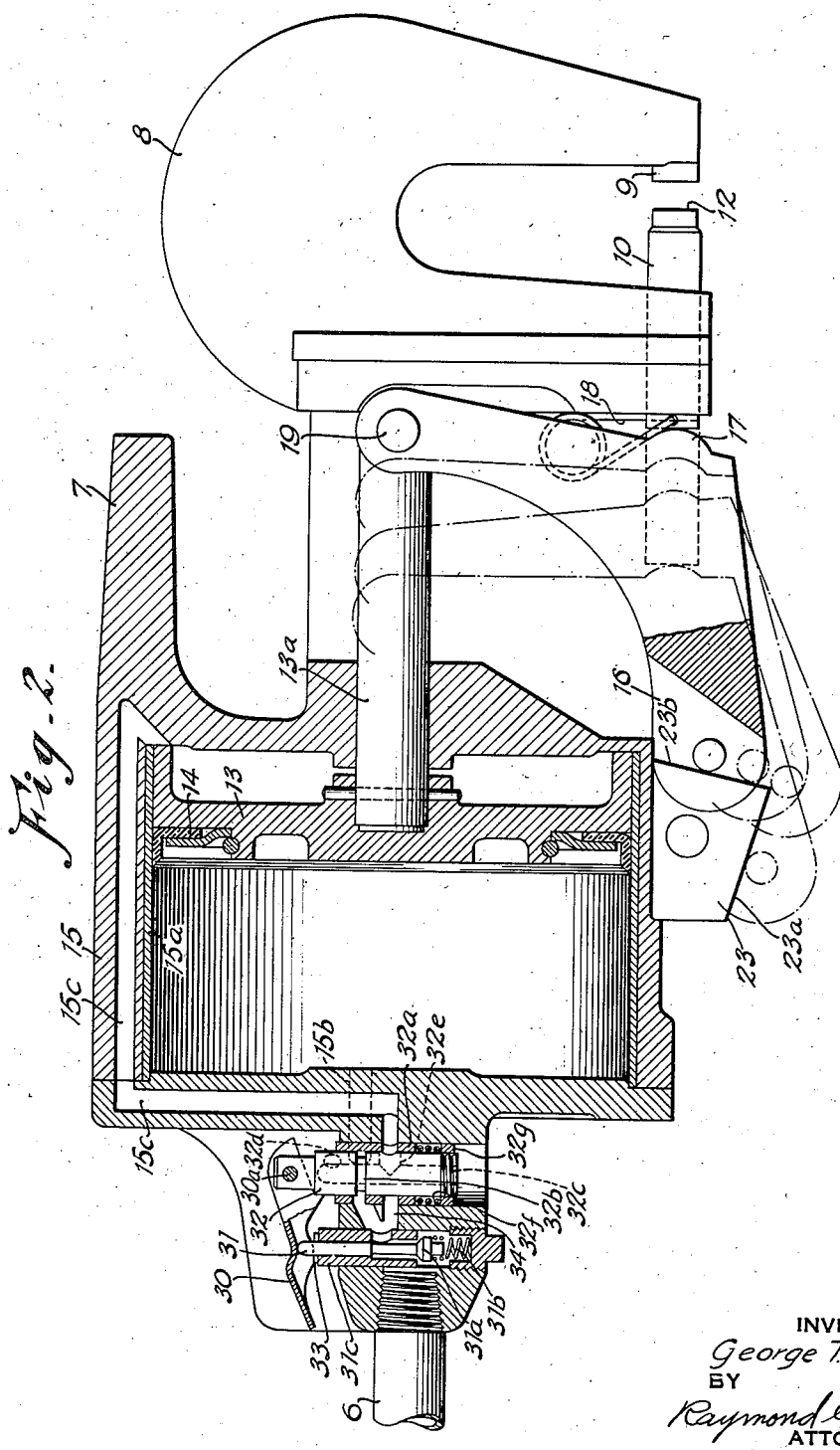
INVENTOR
George T. Harcourt.
BY
Raymond G. Mullee
ATTORNEY Patented Sept. 1, 1936

2,052,976

UNITED STATES PATENT OFFICE 2,052,976

POWER CONTROL APPARATUS

George T. Harcourt, Detroit, Mich., assignor to Chicago Pneumatic Tool Company, New York, N. Y., a corporation of New Jersey Original application May 23, 1929, Serial No. 365,535. Divided and this application November 21, 1933, Serial No. 698,971. In Great Britain May 7, 1930

5 Claims. (Cl. 121—3)

This invention relates to power apparatus having broad application to power work which involves pressure as in pushing or compressing, or reverse action as in drawing and pulling, or both movements. While of general application the invention has been particularly developed in relation to small or portable machines, especially hand machines which are of small size and light weight but effect a great multiplication of the power initially applied.

One object of the invention is to effect the combination of a quick travel movement of the working plunger having a minimum application of power with a slow travel movement of the same having a maximum power action. Another object is to provide apparatus which is essentially simple both in construction and operation, and inexpensive to build and assemble. Another object is to effect a better application of power. Still another object is to reduce to a minimum the waste travel of the primary power means. Another object is to utilize a minimum of moving parts. Still another object is to provide improved means for regulating and controlling the speed and manner of movement of the working plunger and the degree and extent of the ultimate force applied to the work. Still another object is to improve the control means for the primary power mechanism. Still other objects will be apparent from the detailed description which follows.

This application is a division of application, Serial No. 365,535 filed May 23, 1929 which was issued on December 19, 1933 as Patent 1,940,087 and relates particularly to the means for controlling the supply of motive fluid to the motor or other fluid pressure device.

The invention involves primary power mechanism, a working plunger, and intervening means for apportioning the operation of the primary mechanism between mere movement of the plunger into contact with work and the actual application of power. By preference the intervening means take the form of a lever generally triangular in shape with the apex in contact with the working plunger, one base end attached to the primary power mechanism and the other base end floating. The guide means for the floating end of the lever determine the effect upon the working plunger of the application of the primary force to the other base end. The guide means may take the form of a guide block and the configuration of the guiding surfaces thereon apportions the amount of the primary power which is utilized for mere waste movement of the working plunger (necessary to bring it into contact with the work), and determines the speed of application and extent of ultimate multiplied power expended in actual work. The guiding surfaces for producing the desired effects may be angularly disposed relative to one another and may comprise a series, if "dwells" of the working plunger are desired during one full movement of the same in one direction. By providing opposed guiding surfaces on the guide block the plunger may be arranged to perform work in both directions of movement. The invention further involves an improved method and means of manual control whereby a single operating member not only actuates the main control but the reversing control as well for the primary power means.

In order to illustrate the invention concrete embodiments thereof are shown in the accompanying drawings, in which:

Fig. 1 is a sectional view, with certain parts in elevation, of an adaptation of the invention to squeeze riveting, the primary power piston being in its retracted position; and Fig. 2 is a view, similar to Fig. 1, of the same machine with a modified form of guide block and showing the primary power piston in its extended position.

The compression riveting machine shown in Fig. 1 is intended for heading cold rivets of alloy steel or duralumin which require a very heavy pressure securely to clamp metal sheets or plates in engagement and to form a proper head upon the rivet. The tool shown is of the small hand type provided with handles 6 and 7, a yoke 8 for engagement with the work having an anvil 9, and in line with the latter a working plunger 10 for reciprocatory movement within a bushing 11 in the yoke. Plunger 10 carries a replaceable abutment, rivet set, punch, or other working tool 12.

For the primary power means any suitable or desired motor may be used. In the present instance, the motor is of the fluid pressure type operated by compressed air which enters through handle 6 and is arranged to reciprocate a piston 13 provided with suitable packing means 14 within a cylinder 15 from which handle 7 extends. The piston chamber of the cylinder may be provided with a renewable lining or bushing 15a. Piston 13 has a rod or plunger 13a which projects beyond cylinder 15 and reciprocates with the piston axially of the tool toward and from yoke 8. Working plunger 10 is offset relative to power plunger 13a and may be angularly disposed relative thereto but is shown in parallelism therewith.

The operating connection between power plunger 13a and working plunger 10 comprises a lever 16 which is generally triangular in shape, as indicated. The apex of the lever engages plunger 10 and is provided with a renewable bearing member 17 for direct contact with the plunger. Resilient means such as a spring 18 acting on plunger 10 yieldingly urges the same to retracted position and maintains it in contact with bearing member 17. One of the base ends of lever 16 is pivotally connected to the projecting end of power plunger 13a as by a pivot pin 19. The other base end of the lever is provided with a frictionless bearing 20 supporting a roller 21 which engages a guide block 22 secured to cylinder 15.

The configuration of the surfaces of guide block 22 engaged by roller 21 determines the character of movement of working plunger 10 and the ratio of effective power applied thereby.

In the form shown in Fig. 1, the guide block has a guiding surface 22a in substantial parallelism with a power plunger 13a and a second guiding surface 22b at a right angle thereto. Surface 22a causes fast advancing movement of plunger 10, for as pressure fluid is admitted to the rear of primary piston 13 the piston moves forwardly along with plunger 13a and lever 16 since roller 21 is then being guided along the horizontal guide surface 22a and the latter is parallel with the center line of the power plunger travel. Thus the movement of these parts is at the speed of piston 9. This portion of the movement brings abutment 12 up to the work. Roller 21 has then reached point 22c and as it begins to move along surface 22b, lever 16 swings on its pivot 19 producing a wedging action between working plunger 10 and guide surface 22b with steadily increasing leverage and multiplication of power until roller 21 reaches the center line or axis of working plunger 10. On reversing the fluid pressure motor, piston 13 and power plunger 13a move rearwardly, roller 21 retracing its movement along guide surface 22b around corner 22c and then along surface 22a to its full line position, working plunger 10 meantime being retracted and maintained in contact with bearing member 17 by spring 18. With this arrangement, the advancing of working plunger 10 to engagement with the work is rapid, without multiplication of power, and consumes only a fraction of the movement of primary piston 13. During the transverse movement of roller 21 on guide surface 22b, the movement of plunger 10 is much slower but increases in power by reason of the wedging action referred to above.

Fig. 2 shows a machine similar in all respects to that disclosed in Fig. 1 and having similar parts indicated by the same reference characters with the exception of the guide block 23. This guide block has angularly disposed guide surfaces 23a and 23b which form an acute angle, rather than a right angle as in Fig. 1, and are each oblique to the longitudinal and transverse axes, respectively, of the tool. The net result of this guide arrangement is to effect a longer throw or movement of working plunger 10 than was possible with the guide arrangement shown in Fig. 1, and the stages of movement—both without multiplication of power and with increase in power—are greater than in the Fig. 1 arrangement.

The invention also involves novel control means for the primary power motor. Referring now to Figs. 1 and 2, it is noted that a single manual control lever 30 is provided for actuating both the main control 31 and the reversing control 32. In the event of the use of an electric motor for the primary power means, controls 31 and 32 would be switches but, inasmuch as the motor shown is of the fluid pressure type, control 31 includes throttle valve 31a which is yieldingly urged to its seat by a spring 31b while reversing control 32 consists of a valve reciprocable in a bushing 32a and provided on its exterior with a groove 32b and with an axially extending bore 32c provided with ports 32d and 32e for registration in alternation with a port 15b leading to the rear end of the piston chamber and with the passage 15c leading to the forward end thereof. A coil spring 32f seated against bushing 32a engages a threaded collar 32g on valve 32 yieldingly to maintain the valve in its lowermost position as indicated in Fig. 1. Lever 30 is pivotally connected to valve 32 as by a pivot pin 30a and has a fulcrum portion 30b arranged to engage a washer 33 upon the top of guide bushing 31c for throttle control 31.

Normally, the control lever and the valves are in the positions shown in Fig. 1, throttle valve 31a being closed and groove 32b establishing communication between one of the branches of inlet port 34 and passage 15c leading to the forward end of the piston chamber. The rear end of the piston chamber is vented to atmosphere through ports 15b, 32d, and vent bore 32c. To operate the control valve to move piston 13 forwardly, the operator presses down hard upon lever 30 and such movement of lever 30 opens throttle valve 31a and causes the fulcrum portion 30b of the lever to engage washer 33 whereupon pivot pin 30a lifts reversing valve 32 to the position shown in Fig. 2 whereupon the upper branch of inlet 34 is connected by groove 32b to port 15b opening into the rear end of the piston chamber, the forward end of which is vented to atmosphere through passage 15c, port 32e, and vent bore 32c. To effect reverse movement of the piston, the operator releases the pressure on lever 30 sufficiently to permit spring 32f to move valve 32 to its lowermost position (Fig. 1) but still maintains sufficient pressure on the lever to hold the fulcrum 30b in contact with washer 33, for thus throttle valve 31 is held open. Release of all pressure on lever 30 permits the closing of throttle valve 31a by spring 31b and restores all the parts to the position shown in Fig. 1.

Summarizing the above described operation, the invention claimed in this application comprises a supply control 31 and a reversing control 32 both operated by a three-position lever 30. In either of the two off-normal positions of the lever, the supply control admits motive fluid to the reversing control, which performs the dual function of distributing the motive fluid to one end of the motor depending on the position of the lever, and at the same time discharging the other end of the motor to atmosphere.

While the invention has been herein disclosed in what are now considered to be preferred forms thereof, it is to be understood that the invention is not limited to the specific details thereof but covers all changes, modifications, and adaptations, within the scope of the appended claims.

What I claim is:

1. A fluid pressure operated device comprising a body member having a passageway therein, an admission valve mounted in said body member for controlling the admission of air to said passageway, reversing means for controlling direction of flow of air in said passageway, a manually operable lever controlling said valve and reversing means, said lever being adapted to be grasped in the hand and being arranged to act, by continuous movement toward the body member, first to open the admission valve and thereafter to operate the reversing means, said valve having a portion engaging the lever and adapted to be depressed thereby to open position, a spring normally holding said valve in closed position, and yielding means including a second spring tending to arrest the lever in an intermediate position between the opening of the admission valve and the operation of the reversing means, said second spring being of sufficient strength relative to the first-mentioned spring to require a greater manual force to move the lever beyond said intermediate position than is required to move said lever from its normal to its intermediate position.

2. A pneumatic controller comprising a fluid pressure operated device, an admission valve for controlling the admission of air to the device, a spring engaging said valve and urging it toward closed position, a discharge valve for controlling the discharge of air from the device, a manually-operable member controlling said valves and arranged to act, by continuous movement in one direction toward said admission valve and against the pressure of said spring, first to open the admission valve and thereafter to close the discharge valve, and yielding means tending to arrest the manually-operable member in a position intermediate between the opening of the admission valve and the closing of the discharge valve, said yielding means comprising a second spring which is interposed between a part carried by the manually-operable member and a part fixed to the fluid pressure operated device, said second spring being arranged to resist movement of the manually operable member relative to said device, said second spring being of sufficient strength as compared with the first-mentioned spring to require a greater manual force to move the member beyond said intermediate position than is required to move said member from its normal to said intermediate position.

3. In combination, a fluid pressure motor having a main throttle valve with a projecting stem and a base adjacent thereto, and a reversing valve, a spring for yieldingly holding said reversing valve in one position, an actuating lever pivoted at one end upon said reversing valve and having a portion extending above the projecting stem of said throttle valve, a separate spring for forcing the throttle valve against the lever, said lever having a fulcrum part to engage said base, whereby on initial movement of said lever said throttle valve is opened and on further movement said reversing valve is moved against the action of said first-mentioned spring.

4. In combination, a fluid pressure motor having a throttle valve with an upwardly projecting stem and a fixed base surrounding the stem, a reversing valve, said valves being adapted to reciprocate along parallel axes respectively, a fluid passage leading from the throttle valve to the motor, said passage being under control of the reversing valve, a spring urging the throttle valve upwardly to closed position, a second spring urging the reversing valve downwardly to reversing position, a lever pivotally connected to the reversing valve, said lever being adapted to be grasped in the hand and pressed downwardly against the throttle valve stem to open the throttle valve, said lever having a fulcrum adapted to engage the surrounding base whereby further movement of the free end of the lever causes it to rock about said fulcrum and lift the reversing valve to forward position.

5. A fluid pressure device according to claim 4, in which the reversing valve spring has a greater tension than the throttle valve spring, whereby, when the fulcrum portion of the lever is held against the base of the throttle valve, release of pressure on the free end of the lever permits rapid movement of the reversing valve to forward position.

GEORGE T. HARCOURT.